US006874815B2

(12) United States Patent
Bieber et al.

(10) Patent No.: US 6,874,815 B2
(45) Date of Patent: Apr. 5, 2005

(54) GAS BAG MODULE

(75) Inventors: Udo Bieber, Niedernberg (DE); Christian Lorenz, Leidersbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/172,642

(22) Filed: Jun. 14, 2002

(65) Prior Publication Data

US 2002/0195809 A1 Dec. 26, 2002

(30) Foreign Application Priority Data

Jun. 20, 2001 (DE) .................................. 201 10 175 U

(51) Int. Cl.⁷ .............................................. B60R 21/16
(52) U.S. Cl. .................................................. 280/743.1
(58) Field of Search ........................... 280/743.1, 728.3

(56) References Cited

U.S. PATENT DOCUMENTS

| 6,357,787 B2 * | 3/2002 | Lorenz et al. | ........... 280/728.3 |
| 6,431,599 B1 * | 8/2002 | Bohn | ...................... 280/743.1 |
| 6,443,483 B2 * | 9/2002 | Ellerbrok | .................. 280/728.3 |
| 6,536,801 B2 * | 3/2003 | Frisch | ..................... 280/743.1 |
| 6,540,254 B2 | 4/2003 | Bieber et al. | |
| 6,554,317 B2 * | 4/2003 | Lorenz et al. | ........... 280/743.1 |
| 6,588,798 B2 * | 7/2003 | Bohn et al. | ............... 280/743.1 |

FOREIGN PATENT DOCUMENTS

| DE | 19546001 A1 * | 6/1997 | ........... B60R/21/20 |
| DE | 19749914 | 5/1999 | |
| DE | 19816080 | 10/1999 | |
| DE | 20010726 | 10/2000 | |
| DE | 19758754 A1 * | 1/2003 | ........... B60R/21/05 |
| DE | 20218874 U1 * | 4/2003 | ........... B60R/21/20 |

* cited by examiner

Primary Examiner—Son T. Nguyen
(74) Attorney, Agent, or Firm—Tarolli, Sundheim, Covell & Tummino L.L.P.

(57) ABSTRACT

The invention relates to a the gas bag module, comprising a gas bag and a module housing which has a front wall that closes a ring-shaped outlet opening for the gas bag. A centric portion of the front wall is attached radially inwardly of the outlet opening such that, in the region of attachment, the centric portion is prevented from freely moving outwards when the front wall is opened. At least the centric portion of the front wall, which is attached to the module, has such a thickness and elasticity that upon deployment of the gas bag it swivels, without tearing open radially, about the attachment outwards and radially inwards, as seen from the module, and makes folds in order to clear the ring-shaped outlet opening.

21 Claims, 1 Drawing Sheet

GAS BAG MODULE

TECHNICAL FIELD

This invention relates to a gas bag module.

BACKGROUND OF THE INVENTION

Known gas bag modules comprise a gas bag and a module housing which has a front wall that closes a ring-shaped outlet opening for the gas bag, the ring having a center where a centric portion of the front wall is attached to the remainder of the module such that in the region of attachment the centric portion is prevented from freely moving outwards or from any movement when the front wall is opened.

Such gas bag module is known from DE 197 49 914 A1. In this prior art, the gas bag likewise leaves the module in a ring-shaped manner via the ring-shaped outlet opening and in the fully deployed condition has an indentation proceeding from the front wall and extending as far as into the module. To ensure that the front wall can tear open in a ring-shaped manner, it has a ring-shaped surrounding tear edge, from which radial tear edges extend radially inwards and radially outwards, such that small segments of the front wall are formed. When the front wall tears open, these small segments swivel outwards, as seen from the module. The small segments are retained at the rest of the front wall by a kind of film hinge, the manufacture of the film hinge being very costly, which, moreover, is also true for the tear lines. Moreover, there should always be provided a so-called initial point for the radial tear line, and also for the surrounding tear line, so that the force for opening the front wall can be predetermined within close limits. The precise manufacture of the initial point also requires much effort. The known gas bag modules in addition have a temperature-dependent opening behavior, since at different temperatures the plastic material of the front wall has a different hardness and a different tear behavior.

BRIEF SUMMARY OF THE INVENTION

The invention provides a gas bag module which can be produced very economically. This is achieved in a gas bag module comprising a gas bag and a module housing which has a front wall that closes a ring-shaped outlet opening for the gas bag. A centric portion of the front wall is attached to the module radially inwardly of the outlet opening such that, in the region of attachment, the centric portion is prevented from freely moving outwards or from any movement when the front wall is opened. At least the centric portion of the front wall, which is attached to the module, has such a thickness and elasticity that upon deployment of the gas bag it swivels, without tearing open radially, about the attachment outwards and radially inwards, as seen from the module, and makes folds in order to clear the ring-shaped outlet opening.

In contrast to the above-mentioned prior art modules, in which radial tear lines are provided, the front wall has no radial tear line, but is designed much more flexible, so that, similar to a fabric, it moves outwards and radially inwards, thereby making folds. Therefore, the forces necessary for tearing open are much lower than in prior art modules, and there is also achieved a reduced bending moment about the point of attachment during the swivel motion. The resistance exerted by the front wall against the gas bag when the front wall tears open and swivels outwards is thereby reduced. The tear forces can be predetermined within very close limits. The manufacture of such front wall equipped without radial tear lines or radially extending initial tear points is inexpensive.

In accordance with the preferred embodiment, the folded gas bag has a chamber which is ring-shaped upon deployment and a front side facing the occupant, which front side verges into a centric indentation. At the deepest point of the indentation, the gas bag wall is prevented from exiting from the module. When the gas bag is deployed, the centric portion of the front wall, which swivels outwards and radially inwards, is located inside the indentation.

Preferably, there is provided a fastener for fastening the centric portion of the front wall, which can also be used for fastening that part of the gas bag wall which forms the deepest point of the indentation, so that this fastener has a dual function.

Before opening the housing, the centric portion in accordance with one embodiment has a predetermined surrounding tear line, along which it is connected with the rest of the module housing. In this embodiment, the centric portion is integrally connected with the rest of the module housing. In accordance with another embodiment, the centric portion constitutes a separate part, which before opening has been clamped to the rest of the module housing along its radially outer peripheral edge. When opening the cover, this clamping connection is finally released. This embodiment has the advantage that different materials can be used for the centric portion and the rest of the module housing.

The clamping or the tear line can for instance be located close to a transition from the so-called peripheral wall, which extends from the front wall to the rear, to the front wall, so that a rather large outer circumference can be achieved for the ring-shaped outlet opening.

In accordance with the preferred embodiment, the front wall is a film having a thickness of <2.5 mm, preferably 1 mm.

The flexibility of the film should be so high that after the module has opened the film can adapt to the changes in the shape of the gas bag without tearing, but only by forming folds.

DETAILED DESCRIPTION OF THE PREFERRED EMBODIMENTS

Figure 1:
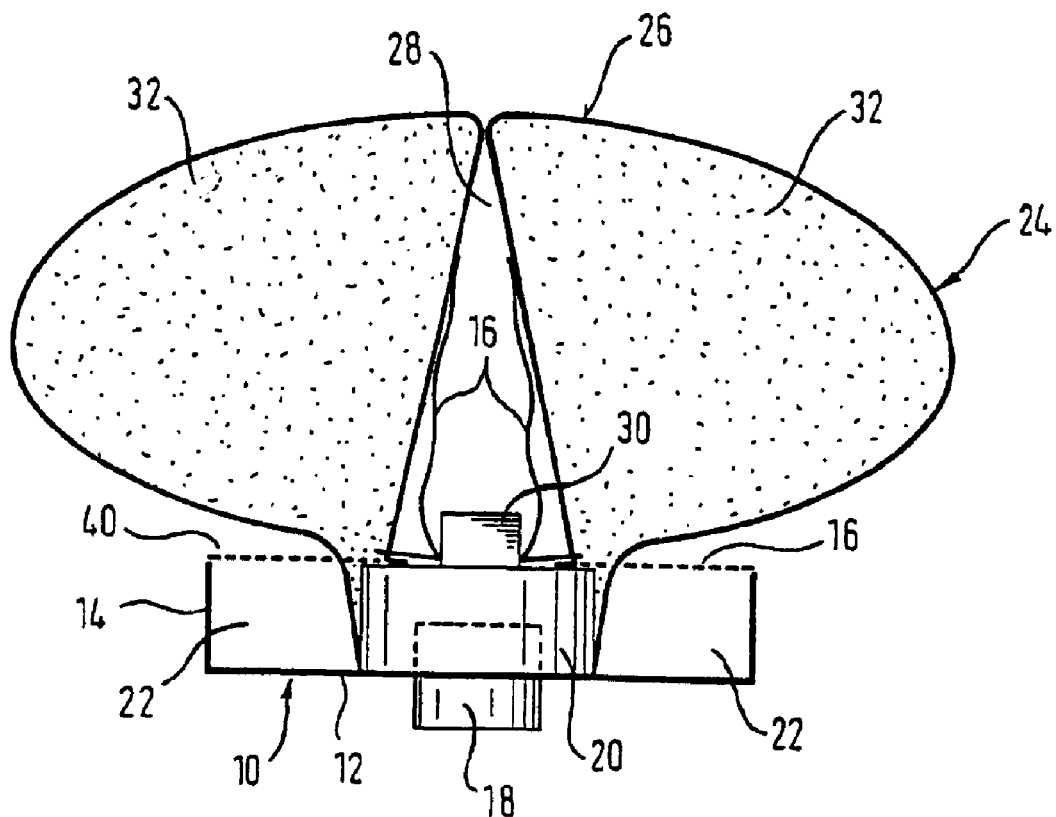
FIG. 1 shows a cross-sectional view of a gas bag module according to the invention with fully deployed gas bag.

In FIG. 1, a gas bag module is represented, which has a box-shaped module housing 10, comprising a rear wall 12, a closed peripheral wall 14 and a front wall 16, the front wall 16 being represented in broken lines with the module closed. A gas generator 18 protrudes through the rear wall 12 partly into the interior of the module housing 10. A pot-shaped diffuser 20 inside the module housing 10 surrounds the gas generator 18 and is attached to the rear wall 12. Between the diffuser 20 and the peripheral wall 14 there is obtained a ring-shaped accommodation space 22 for the folded gas bag, which is designated with 24.

The gas bag consists of a gas bag wall of fabric material, the part of which that faces the occupant (FIG. 1, at the top) forms a so-called front side 26 which the occupant impacts upon in the case of restraint. In the region of its center, the front side 26 has a deep indentation 28. The indentation 28 is formed in that at the deepest point of the indentation 28 the gas bag wall is prevented from exiting from the module housing 10 and, by means of a fastener, is permanently arrested to the diffuser 20 radially inwardly of a ring-shaped outlet opening 40 which is discussed below and thus to the module. The part of the gas bag wall at the deepest point of the indentation 28 is clamped between the upper surface of the diffuser 20 and the lower surface of a metal emblem 30, where between emblem 30 and diffuser 20 the entire front wall 16 is permanently attached to the module by clamping. The emblem 30 thus represents the fastener.

The indentation 28 is not filled with gas, but only a ring-shaped chamber 32 extending around the same.

The front wall 16 is made of a highly flexible plastic film. Alternatively, the front wall might also be made of a fabric or of a film reinforced with a fabric inlay.

Figure 2A:
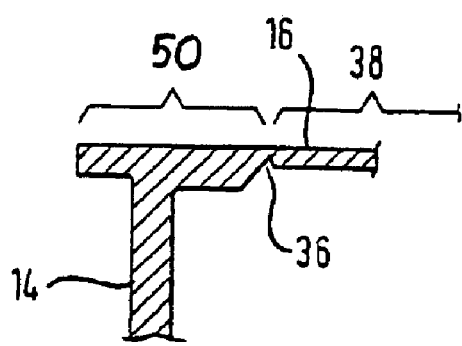
FIGS. 2a and 2b show enlarged views of two designs of the front wall in the region of the transition from the front wall to the peripheral wall of the module housing.

In FIG. 2a it is illustrated that the front wall 16 verges into the peripheral wall 14 in one piece. A ring-shaped, peripherally closed tear line 36 is provided at the rear, which tear line separates a so-called centric portion 38 of the front wall from a radially outer portion 50 of the front wall 16. In the embodiment shown in FIG. 2a, the front wall 16 tears open along the tear line 36 due to the impact of the gas bag 24, so that the centric portion 38 is separated from the remaining part of the module housing. While in the embodiment as shown in FIG. 2a not the entire front wall tears open, but only an inner part defining the centric portion 38, the entire front wall as is indicated in FIG. 1 may alternatively swivel outwards and radially inwards without tearing radially when the module housing 10 is opened. Such swiveling about the attachment (in the present case the clamping between the emblem 30 and the diffuser 20) is effected due to the force of the gas bag 24 exerted on the front wall 16. The centric portion 38 or, in accordance with FIG. 1, the entire front wall 16 has such an elasticity and such a small thickness that the centric portion 38 or the entire front wall 16 is urged radially inwards as well as in outward direction, thereby making folds, but without tearing open radially. The centric portion 38 or the entire front wall 16 is thereby urged into the indentation 28 and exerts little resistance against the gas bag when the same presses open the so-called ring-shaped outlet opening 40 between peripheral wall 14 and side wall of the diffuser 20 at the front wall.

Radial tear lines at the front wall are not provided, and radial lines of weakness can likewise be omitted. As can be seen in FIG. 2a, the front wall may be thinner in the region of the centric portion 38 than at the rest of the front wall 16, in order to increase the flexibility of the centric portion 38.

The formation of folds in the centric portion 38 or in the entire front wall 16 is effected like in a film or fabric.

Figure 2B:
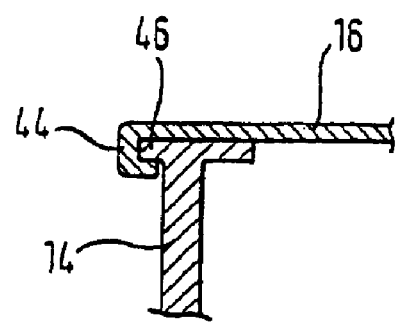

In the embodiment shown in FIG. 2b, the front wall 16 is a separate part in the form of a film, which is attached to the peripheral wall 14 by an external clamping connection. When the module housing is opened, the clamping connection is released, i.e. the radially outer peripheral edge 44 of the front wall 16 comes out of engagement with an annular bead 46 at the peripheral wall 14. Here, corresponding to the FIG. 1 embodiment, the entire front wall 16 swivels outwardly and radially inwardly without tearing radially and by generating folds. In this embodiment, too, the front wall 16 is clamped between emblem 30 and diffuser 20 in the middle of the ring defined by the outlet opening 40, in order to prevent the portion of the front wall below the emblem 30 from moving outwards when the front wall 16 is opened.

What is claimed is:

1. A gas bag module, comprising:
   a gas bag, and
   a module housing which has a front wall that closes an outlet opening for said gas bag which outlet opening is in the shape of a ring,
   said ring having a center where a centric portion of said front wall is attached radially inwardly of said outlet opening such that, in a region of attachment, said centric portion is prevented from freely moving outwards when said front wall is opened,
   at least said centric portion of said front wall, which is attached to said module, having such a thickness and elasticity that upon deployment of said gas bag, said centric portion swivels about said region of attachment outwards of said outlet opening and radially inwards of said outlet opening, without tearing open radially, and makes folds in order to clear said ring-shaped outlet opening,
   wherein not only said centric portion of said front wall but the entire front wall swivels, without tearing open radially, about said attachment radially inwards, as seen from said module, and makes folds.

2. The gas bag module as claimed in claim 1, wherein said deployed gas bag has a chamber which is ring-shaped upon deployment and a front side facing an occupant, which front side verges into a centric indentation, at a deepest point of said indentation said gas bag wall being prevented from exiting from said module, and said centric portion of said front wall, which swivels outwards and radially inwards, being located inside said indentation in a deployed state of said gas bag.

3. The gas bag module as claimed in claim 1, wherein a fastener for attaching said centric portion of said front wall can also be used for fastening that part of said gas bag wall which forms said deepest point of said indentation.

4. The gas bag module as claimed in claim 1, wherein, before said module housing is opened, said centric portion is connected with a rest of said module housing along a predetermined, surrounding tear line.

5. The gas bag module as claimed in claim 1, wherein said module housing has a peripheral wall extending from said front wall to a rear of said module, and said tear line is located close to a transition from said peripheral wall to said front wall.

6. The gas bag module as claimed in claim 1, wherein said centric portion has a radially outer peripheral edge where it is clamped to a remainder of said module housing, said clamping connection being released when said module housing is opened.

7. The gas bag module as claimed in claim 1, wherein said front wall constitutes a film at least in a region of said centric portion.

8. A gas bag module, comprising:
   a gas bag, and
   a module housing which has a front wall that closes all outlet opening for said gas bag which outlet opening is in the shape of a ring,
   said ring having a center where a centric portion of said front wall is attached radially inwardly of said outlet opening such that, in a region of attachment, said centric portion is prevented from freely moving outwards when said front wall is opened,
   at least said centric portion of said front wall, which is attached to said module, having such a thickness and elasticity that upon deployment of said gas bag, said centric portion swivels about said region of attachment outwards of said outlet opening and radially inwards of said outlet opening, without tearing open radially, and makes folds in order to clear said ring-shaped outlet opening, wherein said centric portion has a radially outer peripheral edge where it is clamped to a remainder of said module housing, said clamping connection being released when said module housing is opened to free the outer peripheral edge from said module housing.

9. The gas bag module as claimed in claim 8, wherein said deployed gas bag has a chamber which is ring-shaped upon deployment and a front side facing an occupant, which front side verges into a centric indentation, at a deepest point of said indentation said gas bag wall being prevented from exiting from said module, and said centric portion of said front wall, which swivels outwards and radially inwards, being located inside said indentation in a deployed state of said gas bag.

10. The gas bag module as claimed in claim 8, wherein a fastener for attaching said centric portion of said front wall can also be used for fastening that part of said gas bag wall which forms said deepest point of said indentation.

11. The gas bag module as claimed in claim 8, wherein not only said centric portion of said front wall but the entire front wall swivels, without tearing open radially, about said attachment radially inwards, as seen from said module, and makes folds.

12. The gas bag module as claimed in claim 8, wherein, before said module housing is opened, said centric portion is connected with a rest of said module housing along a predetermined, surrounding tear line.

13. The gas bag module as claimed in claim 8, wherein said module housing has a peripheral wall extending from said front wall to a rear of said module, and said tear line is located close to a transition from said peripheral wall to said front wall.

14. The gas bag module as claimed in claim 8, wherein said front wall constitutes a film at least in a region of said centric portion.

15. A gas bag module, comprising:

a gas bag, and a module housing which has a front wall that closes an outlet opening for said gas bag which outlet opening is in the shape of a ring, said ring having a center where a centric portion of said front wall is attached radially inwardly of said outlet opening such that, in a region of attachment, said centric portion is prevented from freely moving outwards when said front wall is opened, at least said centric portion of said front wall, which is attached to said module, having such a thickness and elasticity that upon deployment of said gas bag, said centric portion swivels about said region of attachment outwards of said outlet opening and radially inwards of said outlet opening, without tearing open radially, and makes folds in order to clear said ring-shaped outlet opening, wherein said front wall comprises a thinner film in a region of said centric portion which is attached to a thicker peripheral wall of said module housing at a radially outer portion of said front wall.

16. The gas bag module as claimed in claim 15, wherein said deployed gas bag has a chamber which is ring-shaped upon deployment and a front side facing an occupant, which front side verges into a centric indentation, at a deepest point of said indentation said gas bag wall being prevented from exiting from said module, and said centric portion of said front wall, which swivels outwards and radially inwards, being located inside said indentation in a deployed state of said gas bag.

17. The gas bag module as claimed in claim 15, wherein a fastener for attaching said centric portion of said front wall can also be used for fastening that part of said gas bag wall which forms said deepest point of said indentation.

18. The gas bag module as claimed in claim 15, wherein not only said centric portion of said front wall but the entire front wall swivels, without tearing open radially, about said attachment radially inwards, as seen from said module, and makes folds.

19. The gas bag module as claimed in claim 15, wherein, before said module housing is opened, said centric portion is connected with a rest of said module housing along a predetermined, surrounding tear line.

20. The gas bag module as claimed in claim 15, wherein said module housing has a peripheral wall extending from said front wall to a rear of said nodule, and said tear line is located close to a transition from said peripheral wall to said front wall.

21. The gas bag module as claimed in claim 15, wherein said centric portion has a radially outer peripheral edge where it is clamped to a remainder of said module housing, said clamping connection being released when said module housing is opened.

* * * * *